March 15, 1960 H. E. TRACY 2,928,685
PACKING MEANS FOR HIGH PRESSURE MECHANICAL SEALS
Filed March 31, 1958 2 Sheets-Sheet 1

INVENTOR,
HERBERT E. TRACY
BY
ATTORNEY

March 15, 1960  H. E. TRACY  2,928,685
PACKING MEANS FOR HIGH PRESSURE MECHANICAL SEALS
Filed March 31, 1958  2 Sheets-Sheet 2

INVENTOR,
HERBERT E. TRACY
BY
*Allen E. Hambly*
ATTORNEY

ID
2,928,685
PACKING MEANS FOR HIGH PRESSURE MECHANICAL SEALS

Herbert E. Tracy, Alhambra, Calif., assignor to Borg-Warner Corporation, Chicago, Ill., a corporation of Illinois Application March 31, 1958, Serial No. 725,052

15 Claims. (Cl. 286—11.14)

The present invention relates to mechanical seals, and more particularly to improve means for packing off or sealing the gap between the mechanical sealing elements and the shaft of a mechanical seal assembly.

In my co-pending applications, Serial No. 722,077 filed March 17, 1958, and Serial No. 725,051 filed March 31, 1958, improved mechanical seal assemblies are disclosed and claimed, wherein fluid under pressure is contained in an annular chamber between the relatively rotatable mechanical seal rings. In application Serial No. 722,077, the pressure in this annular chamber is at a predetermined value and is admitted from an outside source, while in the mechanical seal of application Serial No. 725,051, fluid pressure in the annular chamber is a function of the pressure drop across the seal faces.

A primary object of the present invention is to provide a seal construction wherein fluid pressure in an annular chamber between the relatively rotatable elements of the seal assembly is advantageously employed for a purpose other than counterbalancing pressure acting across the mechanical seal faces or adjusting the running condition of the mechanical seal elements.

In addition to the problems encountered in high pressure seal applications with respect to excessive unit loading of the seal elements tending to render the seal ineffective—which problems have been effectively obviated by reasons of the inventions of my co-pending applications referred to above—a further problem exists with respect to providing an effective seal between the mechanical sealing elements and the rotary member or shaft. In a construction where the rotatable mechanical sealing means is mounted on the shaft for rotation therewith, U-cup type packings have generally been employed between opposing cylindrical portions of the mechanical sealing element and the shaft for preventing the passage of fluid under pressure therebetween. In the case where the pressure being sealed is, for example, on the order of 2000 p.s.i., then the packing cup is subjected to extreme service conditions. In those applications where a plurality of such cups are disposed in axially spaced relation, the outermost cup; that is, the cup initially opposing housing pressure, must nevertheless withstand the high housing pressures independently of its being backed up by additional packing cups.

In view of the foregoing it is a further object of the present invention to provide a seal construction whereby the fluid pressure in an annular chamber between the relatively rotating mechanical seal members, whether such pressure be at a predetermined value or at an indefinite value determined by the pressure drop across the seal faces, may be advantageously employed so as to partially counterbalance fluid pressure acting across a plurality of axially spaced U-cups or other packings between the shaft and one of the mechanical sealing members.

Another object is to provide a mechanical seal assembly according to the foregoing objectives, wherein a plurality of axially spaced packing rings are disposed about the rotatable shaft between the shaft and the mechanical sealing member thereon, with an expander member interposed between the packing rings, and providing a fluid passageway through the expander into the space between said packing rings in combination with means provided by the mechanical sealing elements for conducting fluid from between the mechanical sealing elements to the space between the packing rings.

Other objects and advantages of the invention will be hereinafter described or will become apparent to those skilled in the art, and the novel features of the invention will be defined in the appended claims.

In the accompanying drawings.

Like reference characters in the several figures of the drawings and the following description designate corresponding parts.

Figure 1:
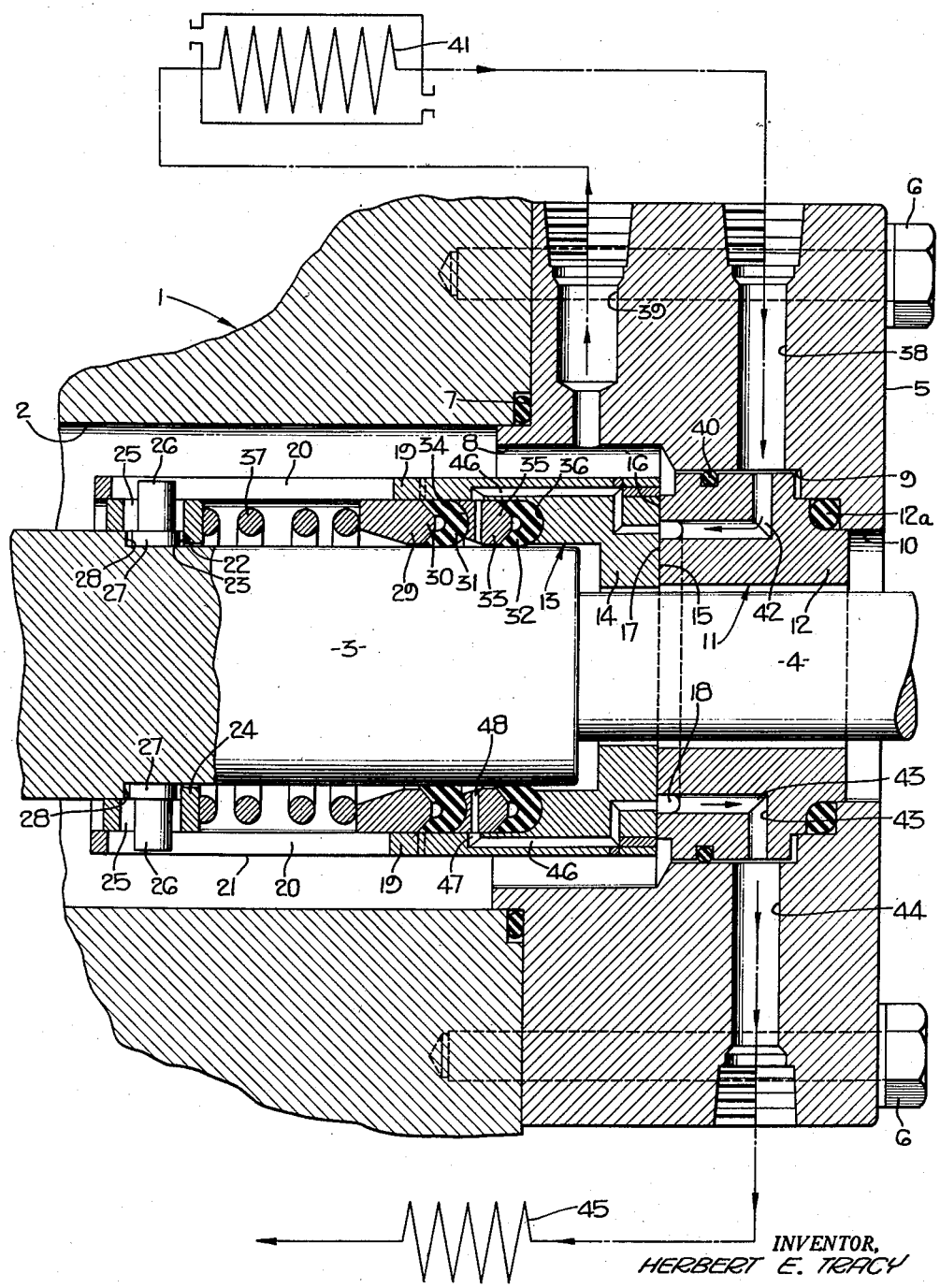
Fig. 1 is a longitudinal sectional view with certain of the parts shown in elevation, of an mechanical seal assembly embodying the invention.

Referring particularly to Fig. 1, there is shown a pump or other housing 1, having a stuffing box or opening 2 therein through which extends a shaft 3 having a reduced end 4. Concentrically disposed about the shaft is in annular seal flange 5 which is secured to the outer face of the housing 1, as by means of a suitable number of screws 6, with an O-ring or other appropriate seal 7 disposed between the housing and the flange to prevent leakage therebetween from the stuffing box 2.

The flange 5 is provided with a seal chamber 8 having a reduced diameter section 9 and a further reduced end section 10. Disposed in the reduced section 9 of the chamber 8, is a mechanical seal element or ring 11 having a reduced end section 12 extending into the reduced section 10 of the chamber 8, with an O-ring or other seal 12a sealingly engaged with the flange 5 and with the sealing ring 11 to prevent leakage of fluid therebetween. The O-ring 12a also provides means for holding the ring 11 against rotation so that the ring 11 is a non-rotating element.

The rotating seal element or ring 13 is disposed upon the shaft 3 and is provided with a radially enlarged end section 14, providing a relatively broad radially extended sealing face 15 opposed to a pair of comparatively narrow radially extended sealing surfaces 16 and 17 on the seal ring 11, there being an annular channel or groove 18 extending circumferentially between the faces 16 and 17 in the ring 11.

In order to connect the mechanical seal ring 13 to the shaft 3 for rotation therewith, the ring 13 is provided with a suitable number of ears or lugs 19 extending axially from the inner end of the ring 13 into longitudinally extended slots 20 formed in an expander skirt 21.

Shaft 3 is provided with a radial shoulder 22, with which is engaged a radial flange 23 on a bushing 24. The bushing 24 has openings 25 therethrough, through which project a suitable number of drive pins 26, having heads 27 seating in axially extended slots 28, leading along the shaft from the shoulder 22. It will be noted that the drive pins 26 project into the slots 20 in the expander sleeve 21, so that the rotating seal ring 13 is effectively keyed to the shaft 3 by lugs 19 and drive pins 26 through the expander sleeve 21.

An expander head 29 is provided at one end of the sleeve 21, the head 29 having a tapered end 30 engaged in an opposing U-cup packing 31 so as to expand the latter into engagement with the inner periphery of the seal ring 13 and with the shaft. A second U-cup packing 32 is disposed about the shaft in axially spaced relation to the cup 31, and an expander ring 33 is disposed about the shaft and is provided with an arcuate seat 34 in which the cup 31 is seated, and a tapered end 35 is engaged with the cup 32 to expand the latter. Cup 32 seats in an arcuate seat 36 formed in the body of the seal ring 13.

A coiled compression spring 37 is interposed between the bushing 24 and the expander head 29 and provides means for resiliently biasing the cups 31 and 32 and the expanders 29 and 33, respectively, axially in the direction of the seal flange 5, so that the rotating seal ring 13 is normally biased toward the non-rotating seal ring 11.

Means are provided for admitting fluid under pressure to the annulus 18 in seal ring 11 so as to partially counterbalance the pressure differential across the seal faces 15, 16 and 17, which pressure difference it will be noted is ordinarily from housing pressure; that is, pressure within the stuffing box opening 2, and atmospheric pressure. In the illustrative embodiment these means include a fluid inlet passage 38 extending radially through the flange into the reduced diameter section 9 of the seal chamber. A fluid outlet passage 39 extends radially through the flange communicating with the seal chamber 8.

The seal ring 11 is provided with an O-ring or other appropriate seal 40, which engages with the wall of reduced section 9 of seal chamber 8, so as to effectively separate the outlet passage 39 from the inlet passage 38.

Fluid in the stuffing box opening 2 is free to pass therefrom, through seal chamber 8 and outlet passage 39, exteriorly of the flange 5, and thence through the control tube diagrammatically indicated at 41; the control tube 41 leads back into the seal flange at the inlet passage 38, at the other side of the seal means 40. Seal ring 11 is provided with a fluid passage 42 establishing communication between inlet passage 38 and the annular chamber 18 previously referred to; thus fluid which passes from the stuffing box and through the control tube is admitted to the annulus 18.

In the illustrative seal construction the control tube 41 would desirably be so constructed that, as a result of frictional resistance to flow therethrough in a well known manner, a drop in pressure will be effected so that fluid in the annular channel 18 will be at a pressure approximately one-half of the pressure in the stuffing box 2 or at any other predetermined fractional pressure. Thus the pressure differential across the mechanical sealing elements will be partially counterbalanced across seal face 16, and the pressure difference across seal face 17 will be the difference between pressure in the annulus 18 and atmosphere.

Leading from the annular channel 18, the seal ring 11 is provided with a discharge passageway 43 which communicates between O-ring seals 12a and 40, with an outlet passage 44 extending radially through the flange 5; thence, fluid discharging from the annulus 18 passes through a control tube 45 which is so constructed in the conventional manner, as to effect a reduction in pressure of fluid flowing therethrough from pressure in the annular groove 18 to atmosphere. It should be understood that fluid under pressure may be supplied to the annular groove 18 otherwise than as here illustrated, as, for example, fluid may be admitted to inlet passage 38 from a separate source of supply at a pressure fractionally between stuffing box pressure and atmosphere.

In order to advantageously utilize the fluid pressure in the annular groove 18 so as to partially counterbalance pressure acting across packing rings 31 and 32, rotating seal ring 13 is provided with a suitable number of drilled or otherwise formed passages 46, extending generally longitudinally therethrough from a point communicating with the annular groove 18 to a point radially spaced outwardly with respect to the expander ring 33, at which point an annular groove 47 is provided. In the illustrative embodiment, the groove 47 is formed in the inner periphery of the seal ring 13 and communicates through a suitable number of radial orifices 48 extending through the expander ring 33, so that fluid under pressure corresponding to that in the annular groove 18 is admitted to the zone between the packing rings 31 and 32.

In accordance with the illustrative case stated in the foregoing, if pressure in the annular groove 18 is one-half of stuffing box pressure, which is 2000 p.s.i., then fluid at a pressure of 1000 p.s.i. will be imposed across the respective cups 31 and 32, balancing off half of the housing pressure across cup 31, and cup 32 will be subjected accordingly to fluid at only 1000 p.s.i.

Figure 3:
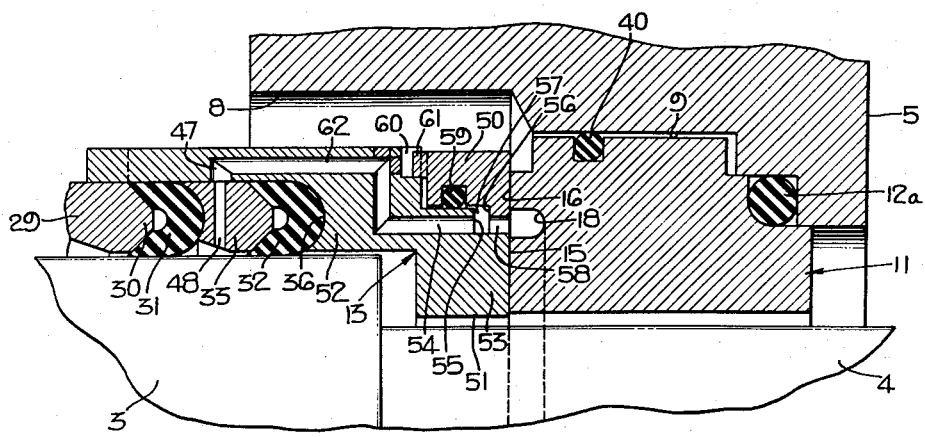
Fig. 3 is a view similar to Fig. 2, but showing a modified mechanical seal assembly having means for directing a balancing fluid to the space between the packing rings.

Referring to Fig. 3 more particularly, the rotating seal means 13 comprises a pair of concentrically mounted separate seal rings 50 and 51, the ring 50 being mounted upon the ring 51 for rotating therewith and for axial movement relative thereto. Ring 51 is provided with a longitudinally extended mounting portion 52 proving the cup seat 36, as previously described. Interposed between the mounting portion 52 and an end section 53 of ring 51, which provides seal face 15, the ring 51 is provided with a radially extended central section 54 providing a face 55 disposed in axially opposed spaced relation to a radial face 56 formed on the inner periphery of ring 50. Thus a pressure chamber 57 is defined between the faces 55 and 56, the pressure chamber 57 communicating through an annular clearance 58 between the rings 50 and 51 with the annular groove 18 in the relatively stationary sealing member 11, as previously described. Interposed between the outer periphery of ring 51 and the inner periphery of ring 50 is suitable sealing means 59, such as an O-ring as illustrated, whereby fluid under pressure in the chamber 57 is prevented from passing between the rings 50 and 51.

Ring 51 is also provided with a suitable number of notches 60 extending axially, and into which project a like number of ears or lugs 61 on the ring 50, which ears serve to interconnect these rings for rotation as a unit, while allowing relative axial movement thereof. In this modified construction, fluid in the annular groove 18 will be at an indefinite pressure between housing or stuffing box pressure and atmosphere, as will be determined by the pressure drop across seal face 16. In practice, if the seal is in a normal running condition, pressure in the annular groove 18 may be approximately one-half of stuffing box pressure, but in any event the fractional pressure is operative upon faces 55 and 56 of rings 50 and 51 respectively.

Pressure in chamber 57 will partially counter-balance the effect of stuffing box pressure tending to urge the ring 51 to the right, as viewed in Fig. 3. In addition, the pressure gradient across faces 15 and 16 will create a force acting to shift rings 50 and 51 to the left, as viewed in Fig. 3; this latter force being a function of the pressure drop across the faces 15 and 16.

Variations in the effective forces created by the pressure in chamber 57 and the pressure gradients across the faces 15 and 16 will automatically effect self-adjustment of the relative axial dispositions of rings 50 and 51 in a manner which is more particularly described in my co-pending application, Serial No. 722,077, referred to in the premises.

Figure 2:
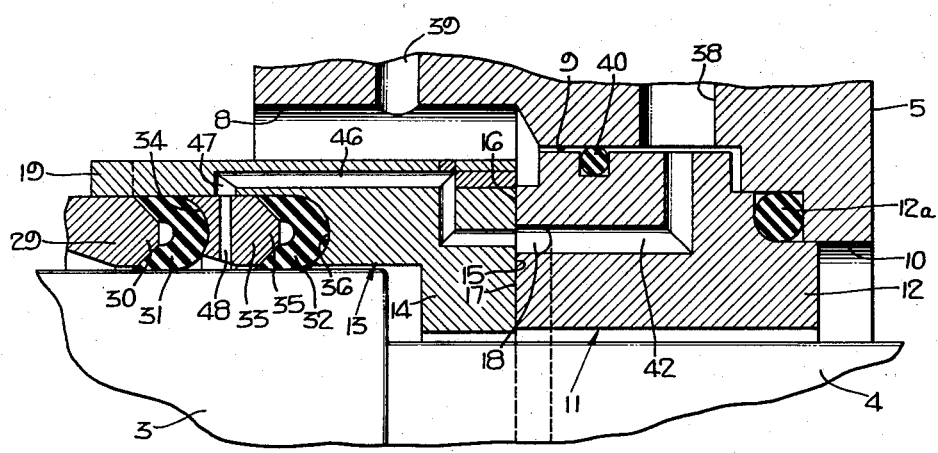
Fig. 2 is an enlarged fragmentary view in longitudinal section particularly showing one form of mechanical sealing means and partially balanced packing rings in accordance with the invention.

In order to advantageously employ the pressure fluid in annular groove 18 in this modified construction, seal ring 51 is drilled or otherwise provided with a generally longitudinally extended passageway 16, communicating with the annulus 47 as previously described in connection with Figs. 1 and 2. Thus the fluid pressure from the groove 18 will be effective to partially counter-balance the pressure differential across packing means 31 and 32.

While the specific details of the two embodiments of the inventions have been herein shown and described, it

I claim:

1. In a mechanical seal assembly, comprising a member having an opening therein, a shaft extending into said opening, relatively rotatable mechanical sealing means connected to said member and to said shaft and having opposed radial seal faces across which there is a pressure drop from fluid pressure in said opening to atmospheric pressure, said mechanical sealing means including a ring disposed about said shaft, and a plurality of axially spaced sealing elements interposed between said ring and said shaft, that improvement wherein means are provided for imposing fluid under a pressure fractionally between the pressure of fluid in the opening and atmospheric pressure between said sealing elements.

2. In a mechanical seal assembly, comprising a member having an opening therein, a shaft extending into said opening, relatively rotatable mechanical sealing means connected to said member and to said shaft and having opposed radial seal faces across which there is a pressure drop from fluid pressure in said opening to atmospheric pressure, said mechanical sealing means including a ring disposed about said shaft, and a plurality of axially spaced sealing elements interposed between said ring and said shaft, that improvement wherein said ring is provided with a passageway leading from a point between said opposed radial seal faces to the space between said sealing elements for conducting fluid under pressure from between said radial seal faces to said space.

3. In a mechanical seal assembly, comprising a member having an opening therein, a shaft extending into said opening, relatively rotatable mechanical sealing means connected to said member and to said shaft and having opposed radial seal faces across which there is a pressure drop from fluid pressure in said opening to atmospheric pressure, said mechanical sealing means including a ring disposed about said shaft, and a plurality of axially spaced sealing elements interposed between said ring and said shaft, that improvement wherein said mechanical sealing means has an annular groove interrupting one of said radial seal faces, said ring having a passageway communicating with said groove and with the space between said sealing elements, whereby fluid pressure in said groove is imposed across said sealing elements.

4. In a mechanical seal assembly including a stationary member having an opening therethrough, a rotatable member extending through said opening, mechanical sealing means including relatively rotatable and axially movable rings having radially extended seal faces disposed in opposed relation, means sealing said rings with respect to said members, including a plurality of axially spaced sealing elements interposed between one of said rings and one of said members, the improvement wherein said last mentioned ring is provided with a passageway communicating with the radial seal faces and with the space between said sealing elements.

5. A mechanical seal assembly as defined in claim 4, wherein said sealing elements are cups, and including an expander interposed between said cups, said expander having an orifice therethrough in communication with said passageway and discharging between said sealing elements.

6. A mechanical seal assembly as defined in claim 4, wherein one of said rings is provided with an annular groove dividing the radial seal face of said ring, and including means for conducting fluid under pressure to said groove, the passageway aforesaid communicating with said groove.

7. A mechanical seal assembly as defined in claim 4, wherein one of said rings is provided with a relatively broad seal face and the other of said rings being concentrically mounted one upon the other and having relatively narrow radially spaced seal faces, and the passageway aforesaid communicating with the space between said relatively narrow faces.

8. A mechanical seal assembly for sealing off the space between a pair of relatively rotatable members, comprising rotatable seal means adapted to be carried by one of said members, relatively non-rotatable seal means adapted to be carried by the other of said members, a plurality of axially spaced sealing rings on said rotatable seal means adapted to be interposed between said rotatable seal means and said one member, and said latter seal means having a passageway communicating from between said rotatable and relatively non-rotatable seal means to the space between said seal rings.

9. A mechanical seal assembly as defined in claim 8 wherein one of said seal means is provided with an annular space with which said passageway communicates, said annular space opening between said rotatable and relatively non-rotatable seal means.

10. A mechanical seal assembly as defined in claim 8, wherein said relatively non-rotatable seal means is provided with an annular groove opposing said rotatable seal means, said relatively non-rotatable seal means also having inlet and outlet passages communicating with said annular groove for conducting fluid under pressure to said annular groove, and said passageway in said rotatable seal means communicating with said annular groove.

11. A mechanical seal assembly as defined in claim 8, wherein said rotatable seal means includes a plurality of concentric rings mounted one upon another for relative axial movement, said rings having portions disposed in radially spaced relation and opposing said relatively non-rotatable seal means, and said passageway in said rotatable seal means communicating with the radial space between a pair of said rings.

12. A mechanical seal assembly comprising a stationary member having an opening therein, a shaft extending into said opening, stationary seal ring means connected to said member, rotatable seal ring means connected to said shaft and including a ring having a portion disposed in spaced relation to said shaft, a plurality of packing elements disposed in axially spaced relation between said shaft and said ring portion, said ring portion having a passageway extending through said ring portion from a point between said packing elements to a point between said stationary and said rotatable seal ring means.

13. A mechanical seal assembly as defined in claim 12, wherein said packing elements are U-cups, and including an expander between said U-cups, said expander having means providing a passage communicating with the passageway aforesaid for directing fluid to the zone between said U-cups.

14. A mechanical seal as defined in claim 12, wherein said stationary seal ring means is provided with inlet and outlet ports leading to an annular area between the rotatable and stationary seal ring means, and including means for supplying fluid under pressure to said inlet port and discharging fluid from said outlet port.

15. A mechanical seal assembly as defined in claim 12, wherein said rotatable seal means includes a seal ring mounted concentrically upon the other seal ring, said rings having end portions disposed in radially spaced relation and opposed to said stationary seal ring means, and said passageway communicating with the space between said end portions.

References Cited in the file of this patent

UNITED STATES PATENTS

| | | |
|---|---|---|
| 2,033,403 | Smittle | Mar. 10, 1936 |
| 2,679,412 | Whitfield | May 25, 1954 |
| 2,824,759 | Tracy | Feb. 25, 1958 |